July 24, 1923.
G. B. COLEMAN
1,462,632
METHOD AND APPARATUS FOR RECTIFYING POLYPHASE CURRENTS
Filed Oct. 16, 1919
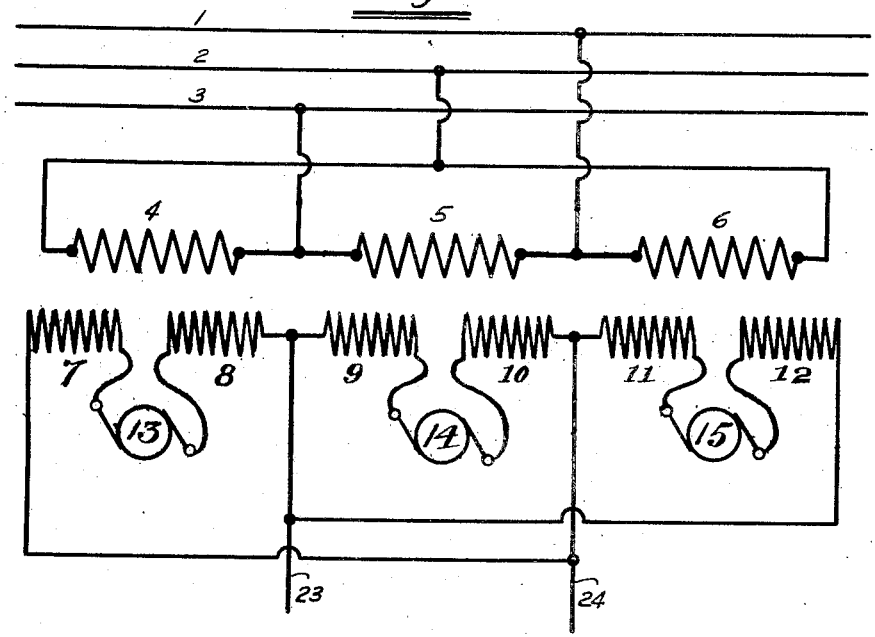
Fig 1
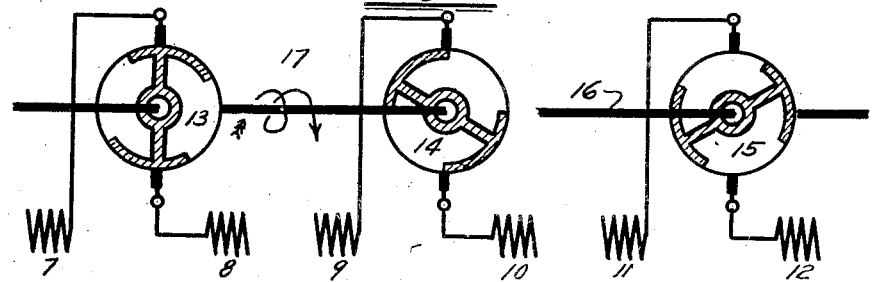
Fig 2
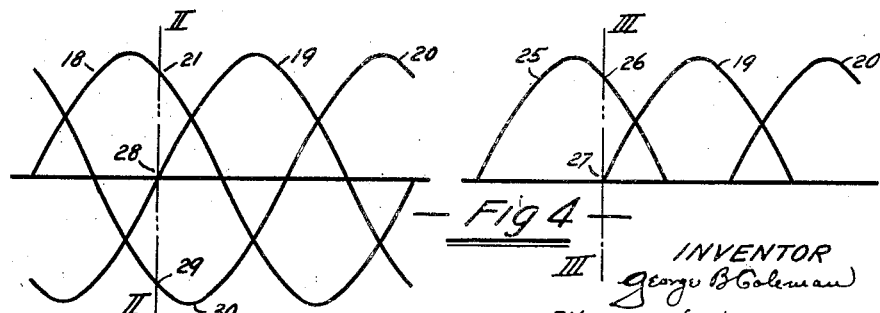
Fig 3
Fig 4
INVENTOR
George B Coleman
BY John N Miller &
George J Henry
ATTORNEYS Patented July 24, 1923.

1,462,632

UNITED STATES PATENT OFFICE.

GEORGE B. COLEMAN, OF SAN FRANCISCO, CALIFORNIA, ASSIGNOR TO COLEMAN X-RAY COMPANY, OF SAN FRANCISCO, CALIFORNIA, A CORPORATION OF CALIFORNIA.

METHOD AND APPARATUS FOR RECTIFYING POLYPHASE CURRENTS.

Application filed October 16, 1919. Serial No. 331,033.

*To all whom it may concern:*

Be it known that I, GEORGE B. COLEMAN, a citizen of the United States, and a resident of the city and county of San Francisco, State of California, have invented new and useful Improvements in Methods and Apparatus for Rectifying Polyphase Currents, of which the following is a specification.

My invention has for its object the production of a rectified or direct current electromotive force derived from the secondary of a polyphase transformer, or a group of transformers whose primary coils are energized by a polyphase electromotive force. Other objects and adaptations of my invention will be made clear from the following disclosure:

The figures and description herein refer specifically to a rectification of direct current delivered from a 3-phase electromotive force, and it will be clear that impressed electromotive forces of any other phase may be utilized in the same way and the connections necessary, and the parts and their arrangement will, from the following disclosure, be clear to those skilled in the art. Referring to the figures:

Fig. 1 illustrates diagrammatically the arrangement of the transformer coils both primary and secondary, each of the secondaries being divided at its neutral point and having interposed therein interrupters by which the conductivity is periodically interrupted and completed.

Fig. 2 shows the arrangement of commutating or current interrupting devices most readily applicable to interrupt the conductivity of the secondary divided transformer coils of Fig. 1.

Fig. 3 indicates the polyphase impressed electromotive force waves.

Fig. 4 shows the derived direct current wave.

Throughout the figures the same numerals refer to similar parts.

The 3-phase supply carrying the impressed electromotive force wave of Fig. 3 is shown by the conductors 1, 2, 3, between which are shown connected in delta the transformer coils 4, 5, 6, the primary coil 4 being between conductors 2 and 3, the primary coil 5 being between conductors 1 and 2, and the primary coil 6 being between conductors 1, 2.

The corresponding secondary coils are indicated at 7, 8, and 9, 10, and 11, 12. Each of these secondary windings is divided at its neutral point and has interposed therein a circuit interrupting device as 13, 14, 15, which I have shown diagrammatically as commutator segments mounted preferably on the single shaft 16, in the angular relationship as shown in Fig. 2, so that there will be at all times an interruption in one of the three secondary windings. In the position of the commutating device interrupter as indicated in Fig. 2, it will be seen that conductivity is complete between coils 7 and 8, through the commutator 13, which is traveling on the shaft 16 in the direction of the arrow 17. The commutator 14 will have just completed the circuit of conductivity of the coils 9 and 10, whereas the commutator 15 will have recently interrupted the circuit between the coils 11 and 12. The corresponding impressed electromotive force in the transformer primary coils 4, 5, 6, will be indicated by the wave curves 18, 19, 20 respectively of Fig. 3.

The position of the commutators on the interrupter of Fig. 2 corresponds with the instant of time indicated by the line II, II, of Fig. 3, and III, III of Fig. 4. The curve 18 of the impressed electromotive force on the primary coil 4 having arrived at the point 21, during which time the commutator segments 13 will have maintained the conductivity of coils 7 and 8 through the period from zero to 21 and the derived electromotive force will therefore have been delivered from the secondary windings 7, 8, into the circuit connections 23, 24, in accordance with the curve 25 of Fig. 4 up to the point 26, which is the point of the secondary or induced electromotive force curve, corresponding with the point 21 on the impressed electromotive force curve 18.

The commutator 14 has just completed the conductivity of the secondary winding 9, 10, corresponding with an induced or derived electromotive force indicated at the point 27 of Fig. 4 and with the impressed electromotive force 19 in the primary windings at the point 28 of Fig. 3 the winding 9, 10, is therefore commencing to deliver its induced current to the circuit 23, 24. At this same instant of time the commutator 15 is retaining an interruption in the winding 11, 12 at its neutral point so that no derived current is flowing, although the impressed electromotive force in the corresponding primary winding 6 is proceeding in accordance with the curve 30, and has arrived at the point 29. It will therefore be clear that the derived electromotive forces from the transformer secondary windings will be in accordance with the curves 25, 19 and 20 of Fig. 4, and therefore a direct current will be delivered from the secondary terminals of the transformer where there is a 3-phase circuit energizing the primaries 4, 5 and 6 of the said transformer.

It will be obvious from the above description that any form of polyphase impressed electromotive force wave may be utilized to deliver, by my invention, a direct current wave from the transformer secondary without the employment of any rotating coils, and that the interrupting device which I have illustrated diagrammatically in Fig. 2, and which has a rotating shaft 16 carrying commutator segments 13, 14, 15 is intended to run in synchronism with the electromotive force wave, so that the "making" and "breaking" of the conductivity at the neutral points of the secondary windings is to take place at the instant of time when the induced electromotive force in the corresponding winding has a zero value.

While I have shown and described mechanical means for interrupting conductivity of the neutral points of transformer windings, it is obvious that other devices may be used than the rotating commutators, as for example—the well known electrolytic means in which current is permitted to flow in but one direction and is restrained from flowing in the reverse direction, may be utilized at the said neutral points and accomplish the same results, and I wish to be understood as claiming all such variations whereby periodic interruptions in the conductivity at the neutral points of transformer windings is attained.

Reference is herein made to my co-pending applications Serial Numbers—327,513 filed Sept. 30, 1919; 331,034 filed Oct. 16, 1919; 344,101 filed Dec. 11, 1919; 361,584 filed Feb. 26, 1920.

I claim:

1. In a transformer provided with primary coils adapted to be energized from a polyphase electric circuit; secondary coils for the said primary coils, the said secondary coils being subdivided at an intermediate point of each phase winding and means interposed at each of said points of division constructed and adapted to periodically complete and alternately therewith to break the circuit of the corresponding winding during one-half of the wave, respectively.

2. In a transformer provided with primary coils adapted to be energized from a polyphase electric circuit; secondary coils for the said primary coils, the said secondary coils being divided between the terminals of each, and means interposed at each of said points of division constructed and adapted to periodically complete and alternately therewith to interrupt the corresponding windings and comprising a motor and including a rotary shaft in synchronism with the impressed electromotive force, commutator parts on said shaft and brush means in combination therewith adapted to complete and interrupt the windings aforesaid.

3. In an electrical system, a transformer having primary coils adapted to be energized from a polyphase electric circuit, secondary coils each subdivided and means interposed at said points of division constructed and adapted to alternately make and to break the circuit of each phase through the secondary winding during one-half of the wave and a motor adapted to actuate said means in synchronism with said polyphase circuit.

4. In an electric system a transformer and parts in combination therewith as set forth in claim 3 wherein said means are angularly spaced to correspond with the angular displacement of the phases.

In testimony whereof, I have hereunto set my hand at San Francisco, California, this 9th day of October, 1919.

GEORGE B. COLEMAN.

In presence of—
C. B. SMITH,
H. GUYER.